Figure 1:
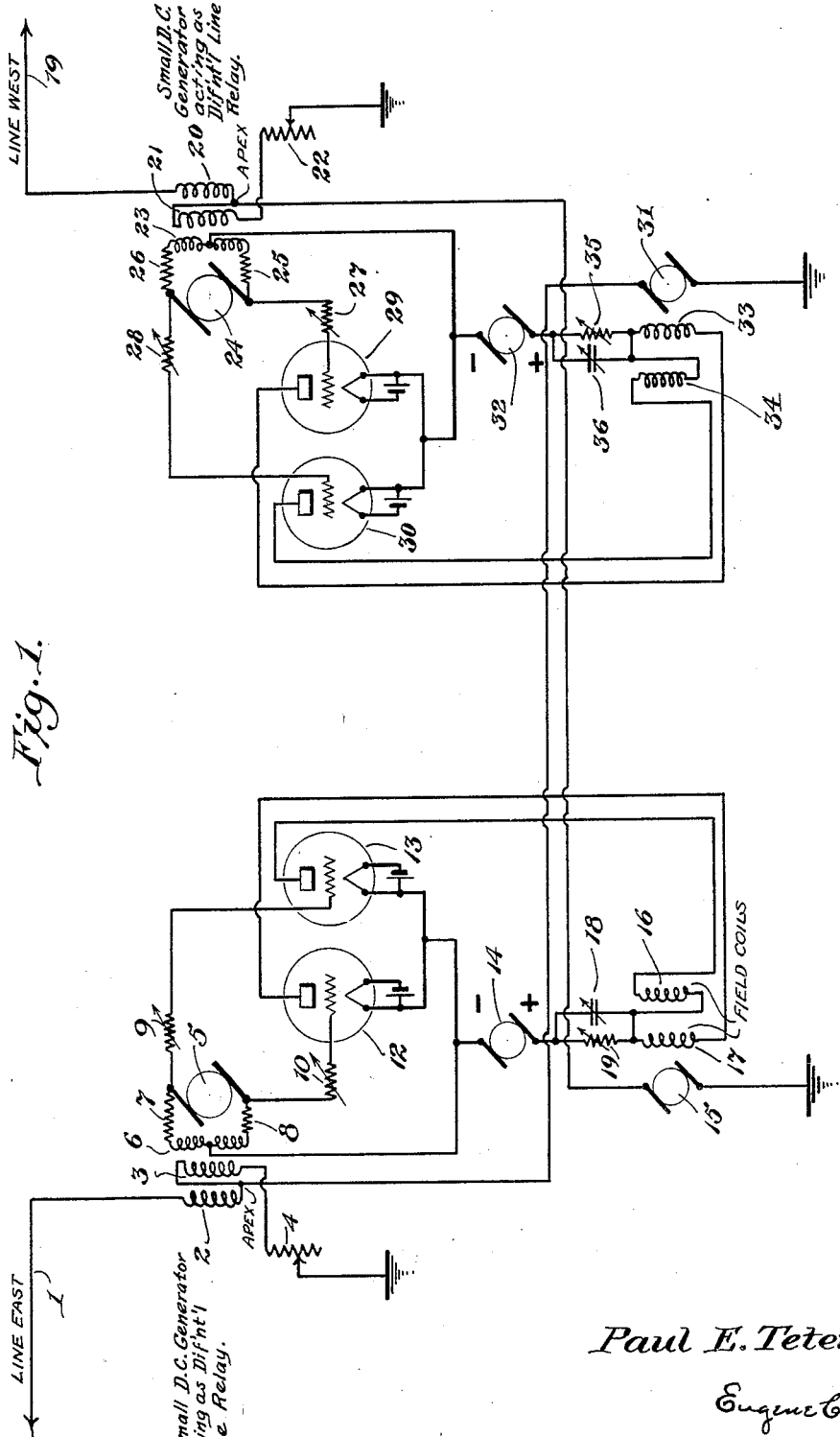

Jan. 19, 1932.    P. E. TETER    1,841,856
DUPLEX REPEATER SYSTEM
Filed Feb. 6, 1930    2 Sheets-Sheet 1

Inventor
Paul E. Teter
Eugene C. Brown
Attorney

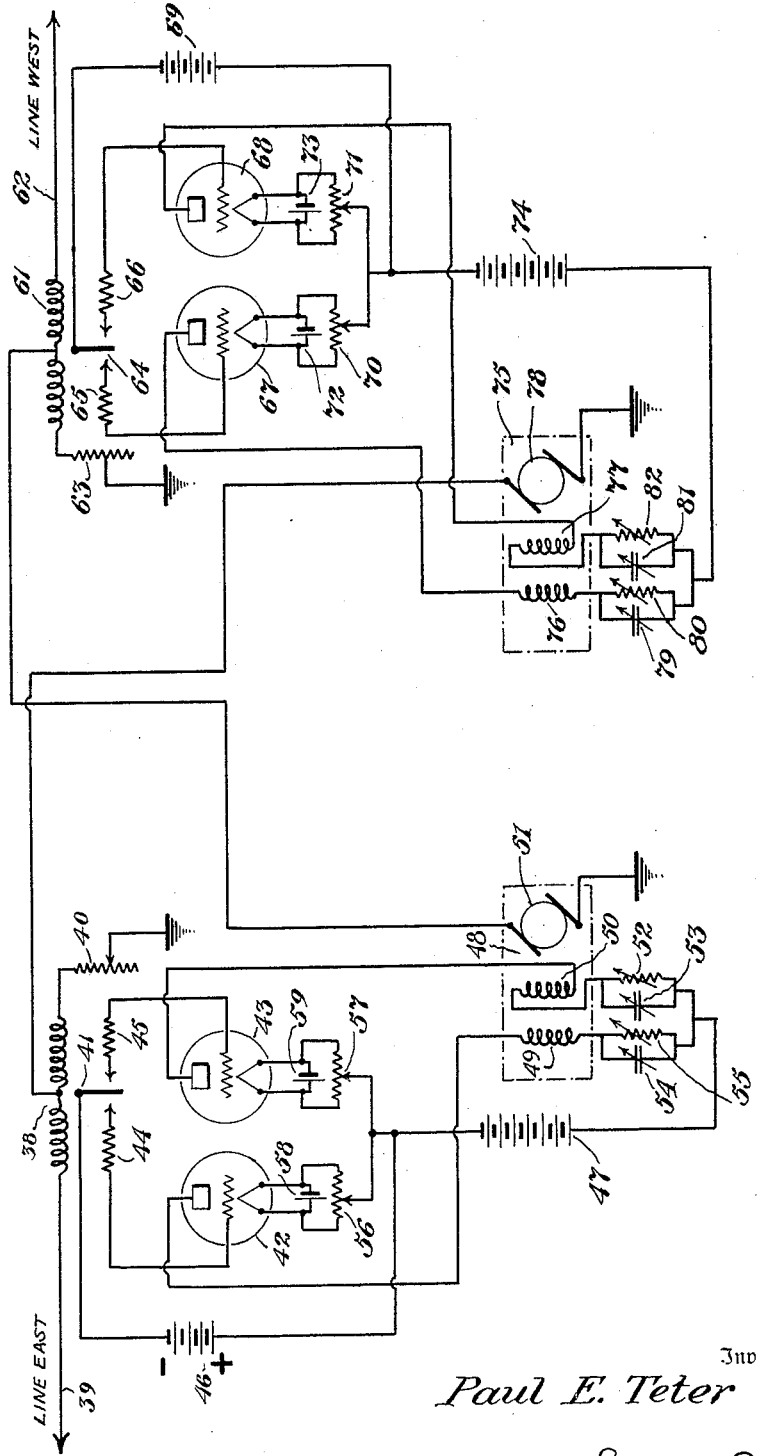

Patented Jan. 19, 1932

1,841,856

UNITED STATES PATENT OFFICE

PAUL E. TETER, OF PLAINFIELD, NEW JERSEY, ASSIGNOR TO THE WESTERN UNION TELEGRAPH COMPANY, OF NEW YORK, N. Y., A CORPORATION OF NEW YORK

DUPLEX REPEATER SYSTEM

Application filed February 6, 1930. Serial No. 426,392.

This invention relates to signaling systems in general, and more particularly to duplex repeater systems.

An object of this invention is to devise a duplex repeater system employing dynamo-electric repeater units.

Another object is to devise a repeater system employing a dynamo-electric repeater, wherein the incoming signal serves to energize the field winding to produce amplified signals in the armature, and wherein the armature is connected back to the line in such manner that the amplified signal does not energize the field winding.

Still another object of this invention is to provide a repeater system wherein thermionic vacuum tubes are employed to control the operation of dynamo-electric repeater units for generating electrical energy in accordance with signaling energy impressed upon circuits of the thermionic vacuum tubes.

Other objects and features of this invention will be apparent to those skilled in the art to which the invention pertains from the following specification and the appended claims.

Figure 1 illustrates one embodiment of this invention, and Figure 2 illustrates a modified form thereof.

Referring to Figure 1 of the drawings, reference numeral 1 designates one of the connecting lines over which signals are transmitted either to or from the repeater station. Line 1 is connected to field winding 2 while field winding 3 is connected through the artificial line 4 to the ground. The junction point in windings 2 and 3 is carried to the armature of generator 31 on the opposite side of the repeater. The artificial line 4 is adjusted so that it has the same characteristics as the real line 1. The same current will then flow from the junction of field windings 2 and 3 through the line and artificial line. The armature 5 of the generator, including the shunt field winding 6, is connected to the grid or control electrodes of the thermionic vacuum tubes 12 and 13. This generator supplies substantially no current to the tube input circuits but is employed merely to impress potentials corresponding to signal impulses transmitted over line 1 upon the grid electrodes of these vacuum tubes. Resistance units 7 and 8 are connected between the armature 5 and the shunt field 6 for controlling the magnitude of the current flowing through the shunt field 6 from the armature 5. Resistance units 9 and 10 are provided in the circuit between the control electrodes of tubes 13 and 12 respectively and the armature 5. The electrical center of the field 6 is connected to the cathodes of the tubes 12 and 13. A source of anode current supply 14 is connected to the field windings 16 and 17 of the transmitting generator 15, the field windings 16 and 17 being normally opposed to each other so that the resultant field is zero when no signal is received. A resistance 19, which is shunted by a variable condenser 18, is connected in series with the source of supply 14. The condenser 18 is adjusted to form a path, the reactance of which varies with the frequency of the signaling energy so that a greater exciting current may be made to flow through the field circuit when signals of the higher frequency range are being transmitted.

The armature 15 is connected between the electrical center of the transmission circuit including the line 19, the field windings 20 and 21, the artificial line 22, and the return or ground circuit. This electrical center or apex is adjusted by means of the artificial line 22 to come at a point between the field windings 20 and 21.

Signaling energy transmitted over the line 1 and the return circuit including the artificial line 4 is caused to excite the field windings associated with the armature 5, and as a result the input circuits of the thermionic vacuum tubes 12 and 13 are energized. The grid electrode of one of these tubes will be at a positive potential with respect to the cathode, while the grid electrode of the other thermionic vacuum tube will be at a negative potential with respect to its cathode. The current through the field winding 16 will increase when the grid electrode of tube 13 is positive with respect to the cathode thereof, and the current through the winding 17 will decrease, since the grid electrode of tube 12 is negative with respect to its cathode when the grid of the tube 13 is positive. The field of the generator 15 is energized when the current through one of the windings 16 or 17 is caused to increase and the current through the other is caused to decrease. Signaling energy is then impressed upon the line 19 from the circuit of generator 15. The signals transmitted to the line 19 from the armature 15 do not energize the field windings 20 and 21 since the magnetic forces of these windings neutralize each other.

The armature of the generator 24 is connected through the resistance units 27 and 28 to the grid electrodes of the thermionic vacuum tubes 29 and 30. A source of anode current supply 32 is connected between the cathodes of the thermionic vacuum tubes 29 and 30 and the field windings 33 and 34 of generator 31. A variable resistance 35 and a variable condenser 36 are connected in shunt with each other into the circuit between the source 32 and the field windings 33 and 34 for compensating for frequency attenuation of the line to which the generator 31 is arranged to transmit signals. The armature of generator 31 is connected between ground and the electrical center of the circuit including the field windings 2 and 3 of generator 5.

Signals transmitted over the circuit of the line 19 are impressed upon the field circuit of the generator 24. The grid potential of one of the thermionic tubes 29 and 30 will increase while that of the other will decrease through the action of the signal potential. The field current through one of the windings 33 and 34 will increase while the current through the other will decrease in accordance with the potentials of the signals impressed upon the grid electrodes of the thermionic vacuum tubes 29 and 30. The magnetic field set up by one of the windings 33 and 34 is then of greater magnitude than that set up by the other; the armature 31 is excited as a result of this in accordance with signaling energy transmitted over the line 19, and signaling energy of greater magnitude is transmitted to the line 1. The current from the generator 31 does not affect the input circuits of the tubes 12 and 13 since the magnetic field set up by this current in the field of the generator 5 is neutralized through the opposed action of windings 2 and 3.

In Figure 2 of the drawings a modified form of this invention is illustrated in which the winding of a differential relay 38 is connected in series with the line 39 and the artificial line 40 to operate the armature 41 of the relay for connecting the grid electrode of either the thermionic vacuum tube 42 or the thermionic vacuum tube 43 to the source of grid electrode biasing potential 46 in accordance with the polarity of the signal transmitted over the line 39. Resistance units 44 and 45 are connected into circuit between the grid electrodes of the tubes 42 and 43 and the contacts associated with the armature 41 of the relay. A source of anode current supply 47 is connected between the cathodes of tubes 42 and 43 and the field windings 49 and 50 of the generator 48. Parallel circuits, including the variable condensers 53 and 54 shunted by the variable resistors 52 and 55, respectively, are connected into the circuits of the field windings 49 and 50 for compensating for frequency attenuation of the line to the high frequency signals. Potentiometers 56 and 57 are connected across the cathode current supply sources 58 and 59, respectively, for obtaining balanced operation of the tubes 42 and 43.

The armature 51 of the generator 48 is connected to the electrical center of the relay winding 61 which is connected in series with the line 62 and the artificial line 63. Incoming signals transmitted over the line 39 are impressed upon the input circuit of one of the thermionic vacuum tubes 42 and 43 depending upon their polarity and the field current through one of the field windings 49 and 50 is increased and decreased in the other in accordance with the signaling energy. The magnetic field set up by one of the windings 49 and 50 is thus caused to predominate over that set up by the other through the action of the signals transmitted to the grid circuit of one of the tubes 42 and 43. Signals are thus transmitted by the armature 51 to the line 62.

Incoming signals transmitted over line 62 pass through winding 61 of the receiving relay. The majority of the signaling current then passes to ground by way of armature 51 of the generator on the opposite side of the repeater. A portion, however, passes through artificial line 63 and the relay coil associated with it. The effect of this current is to aid that passing through relay coil 61 in causing the relay to operate. The armature 64 of the differential relay is caused to connect the source of grid bias potential 69 to the grid electrode of either tube 67 or 68, depending upon the polarity of the signals passing through the winding 61. If the incoming signaling energy causes the armature 64 to connect the grid bias potential 69 to the grid electrode of tube 67, a negative potential from the source 69 is impressed upon the grid electrode, and the anode current flowing from the source 74 through the field winding 76 of the generator 75 is decreased. The field windings 76 and 77, which are connected to set up magnetic fluxes in opposition, become unequally energized when the current through the winding 76 is decreased, and the magnetic field of the winding 77 predominates over that set up by the winding 76. The armature 78 of the generator 75 then generates a current which is impressed upon the line 39 as an outgoing signal. This outgoing signal does not produce any effect upon the input circuits of the tubes 42 and 43 since it is impressed upon the winding 38 of the polarized differential relay at a point which corresponds to the electrical center thereof. The line 39 is also balanced electrically by the artificial line 40 so that currents of equal magnitude flow through both portions of the winding 38 from the generator 75.

Resistances 70 and 71 are also provided across the sources of cathode current supplies 72 and 73 respectively. The source of grid bias potential 69 is connected to the centers of these resistances 70 and 71. Where it is desired to compensate for frequency attenuation of the transmission line to the higher frequency signals the variable condensers 79 and 81 which are connected in shunt with the resistors 80 and 82, respectively, are adjusted to permit exciting currents of higher magnitudes to flow through the field windings 76 and 77 when the frequency of the signals increases. The arrangement is similar to that including variable condensers 53 and 54 and resistors 52 and 55 in the field circuits of the generator 48.

Where it is found desirable to do so, high resistance leak paths may be connected between each of the grid and cathode electrodes of the thermionic vacuum tubes 42, 43, 67 and 68 if the operation of these tubes is not stable without them.

By suitable rearrangement, the schemes shown in Figures 1 and 2 can be utilized for simplex as well as duplex operation.

It is, of course, understood that this invention is susceptible of various detailed modifications and, therefore, I do not desire to limit it to the details as set forth in the foregoing specification except in so far as these details may be defined by the following claims.

I claim:

1. A duplex repeater system comprising two line sections, a dynamo-electric repeater for each line section and having a field winding energized by signals transmitted over the line section, the output circuits for each repeater being connected to the neutral point of the field winding of the repeater.

2. In a signaling system, a signaling circuit, a dynamo-electric repeater having a field winding energized by signals transmitted over said circuit, and an output circuit for said repeater connected to the electrical center point of said field winding.

3. In a signaling system the combination of a polarized relay, a generator having a plurality of field windings, a source of supply for energizing said field windings, said polarized relay being arranged for operation through the action of signaling energy, said polarized relay being connected to selectively vary the energization of different ones of said field windings.

4. In a signaling system the combination of a plurality of thermionic vacuum tubes, a generator having a plurality of field windings, connections between one of said field windings and the grid electrodes of said tubes, means for impressing signalling energy upon the circuits of said field windings, a second generator having a plurality of field windings associated with the output circuits of said tubes.

5. In a signaling system the combination of a plurality of thermionic vacuum tubes, a relay operable by incoming signals for controlling the energization of a selected one of said thermionic vacuum tubes in accordance with the incoming signals, a generating unit having a plurality of field windings connected to the output circuits of said thermionic vacuum tubes, said generating unit being arranged so that the field excitation thereof is varied in accordance with the incoming signals.

In testimony whereof I affix my signature.
PAUL E. TETER.